US007706612B2

(12) United States Patent
Luo

(10) Patent No.: US 7,706,612 B2
(45) Date of Patent: Apr. 27, 2010

(54) METHOD FOR AUTOMATIC SHAPE CLASSIFICATION

(75) Inventor: Hui Luo, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1190 days.

(21) Appl. No.: 11/284,569

(22) Filed: Nov. 22, 2005

(65) Prior Publication Data

US 2006/0110046 A1 May 25, 2006

Related U.S. Application Data

(60) Provisional application No. 60/630,270, filed on Nov. 23, 2004.

(51) Int. Cl.
G06K 9/00 (2006.01)
G06K 9/62 (2006.01)
G06K 9/48 (2006.01)

(52) U.S. Cl. .................... 382/181; 382/155; 382/241

(58) Field of Classification Search .................. None
See application file for complete search history.

(56) References Cited

U.S. PATENT DOCUMENTS

| 5,295,201 | A  | * | 3/1994  | Yokohama ............... 382/236 |
| 6,009,212 | A  |   | 12/1999 | Miller et al. |
| 6,181,805 | B1 | * | 1/2001  | Koike et al. ............. 382/118 |
| 6,252,981 | B1 | * | 6/2001  | Guest et al. ............. 382/149 |
| 6,304,677 | B1 | * | 10/2001 | Schuster ................. 382/264 |
| 6,611,630 | B1 |   | 8/2003  | Miller et al. |
| 7,106,903 | B2 | * | 9/2006  | Chang et al. ............ 382/190 |
| 2002/0146174 | A1 | * | 10/2002 | Shimura ................. 382/199 |
| 2002/0164060 | A1 |   | 11/2002 | Paik et al. |

FOREIGN PATENT DOCUMENTS

EP     0 540 869     5/1993

OTHER PUBLICATIONS

Nicolae Duta et al., Automatic Construction of 2D Shape Models, IEEE Transactions On Pattern Analysis and Machine Intelligence, vol. 23, No. 5, May 2001, pp. 433-446.
Ashok Samal et al., Natural Shape Detection Based on Principal Component Analysis, Journal of Electronic Imaging, Jul. 1993, No. 3, pp. 253-263.
U.S. Appl. No. 10/993,055, filed Nov. 19, 2004, Luo et al.
U.S. Appl. No. 60/630,286, filed Nov. 23, 2004, Luo et al.
U.S. Appl. No. 60/630,287, filed Nov. 23, 2004, Luo et al.
U.S. Appl. no. 60/630,326, filed Nov. 23, 2004, Luo et al.
E. Persoon et al., Shape Discrimination Using Fourier Descriptors, IEEE Transactions on Systems, Man, and Cybernetics, vol. SMC-7, No. 3, Mar. 1977.
M. F. Zakaria et al., Fast Algorithm For The Computation Of Moment Invariants, Pattern Recognition, vol. 20, No. 6, pp. 639-643, 1987.
S. R. Dubois et al., An Autoregressive Model Approach To Two-Dimensional Shape Classification, IEEE Transactions on Pattern Analysis and Machine Intelligence, vol. PAMI-8, No. 1, Jan. 1986.

(Continued)

*Primary Examiner*—Matthew C Bella
*Assistant Examiner*—Alex Liew

(57) ABSTRACT

A method for classifying two-dimensional shapes comprising: creating a training dataset for the shape under study with a similar shape group and a dissimilar shape group; computing an average shape from the similar shape group; aligning all shapes in the database to the average shape; and classifying shapes into two clusters based on their similarity distances.

16 Claims, 11 Drawing Sheets

OTHER PUBLICATIONS

N. Duta et al., Automatic Construction Of 2D Shape Models, IEEE Transactions on Pattern Analysis and Machine Intelligence, vol. 23, No. 5, May 2001.

E. M. Arkin, et al., An Efficiently Computable Metric for Comparing Polygonal Shapes, IEEE Transactions on Pattern Analysis and Machine Intelligence, vol. 13, No. 3, Mar. 1991.

* cited by examiner

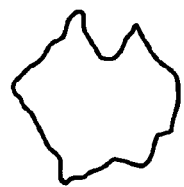 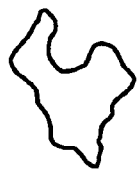 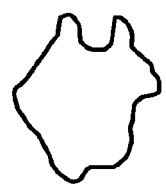 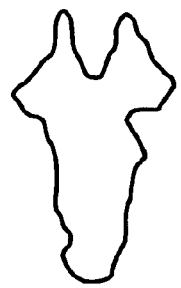 
FIG. 2A  FIG. 2B  FIG. 2C  FIG. 2D  FIG. 2E
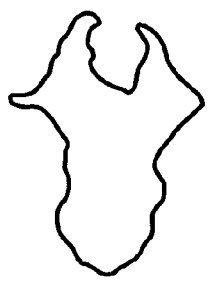 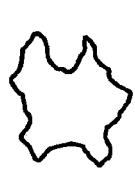 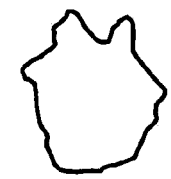 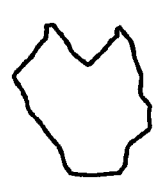  
FIG. 2F  FIG. 2G  FIG. 2H  FIG. 2I  FIG. 2J  FIG. 2K
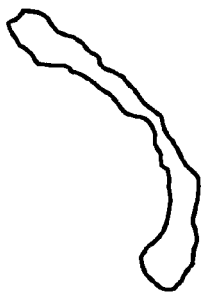 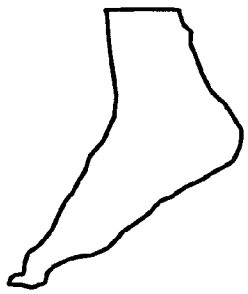 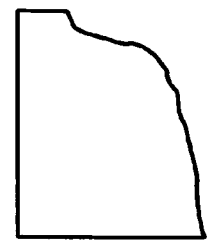 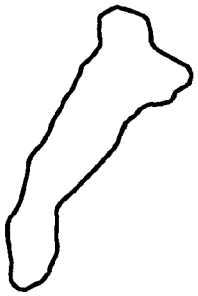 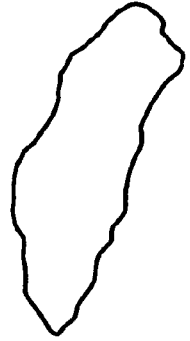
FIG. 2L  FIG. 2M  FIG. 2N  FIG. 2O  FIG. 2P
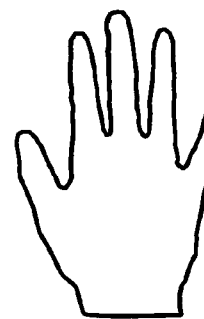 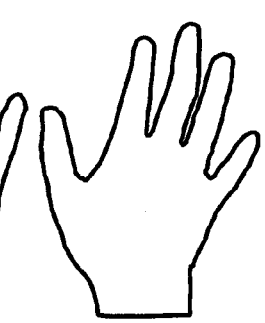 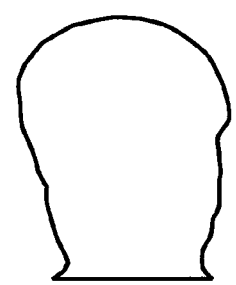 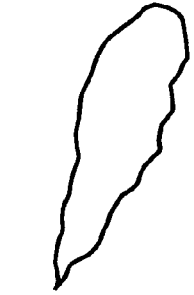 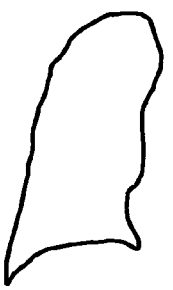
FIG. 2Q  FIG. 2R  FIG. 2S  FIG. 2T  FIG. 2U

METHOD FOR AUTOMATIC SHAPE CLASSIFICATION

CROSS REFERENCE TO RELATED APPLICATIONS

Reference is made to, and priority is claimed from, U.S. Provisional Application No. 60/630,270, entitled "METHOD FOR AUTOMATIC SHAPE CLASSIFICATION", filed on Nov. 23, 2004 in the name of Hui Luo and which is assigned to the assignee of this application, and incorporated herein by reference.

Reference is made to commonly assigned application U.S. Ser. No. 10/993,055, entitled "DETECTION AND CORRECTION METHOD FOR RADIOGRAPH ORIENTATION", filed on Nov. 19, 2004 in the names of Luo et al, and which is assigned to the assignee of this application, and incorporated herein by reference.

Reference is made to U.S. Provisional Application No. 60/630,286, entitled "AUTOMATED RADIOGRAPH CLASSIFICATION USING ANATOMY INFORMATION", filed on Nov. 23, 2004 in the names of Luo et al, and which is assigned to the assignee of this application, and incorporated herein by reference.

Reference is made to U.S. Provisional Application No. 60/630,287, entitled "METHOD FOR RECOGNIZING PROJECTION VIEWS OF RADIOGRAPHS", filed on Nov. 23, 2004 in the names of Luo et al, and which is assigned to the assignee of this application, and incorporated herein by reference.

Reference is made to U.S. Provisional Application No. 60/630,326, entitled "METHOD FOR CLASSIFYING RADIOGRAPHS", filed on Nov. 23, 2004 in the names of Luo et al, and which is assigned to the assignee of this application, and incorporated herein by reference.

FIELD OF THE INVENTION

This invention relates generally to techniques for shape analysis, and more particularly to techniques for automatically classifying two-dimensional (2D) shapes in images.

BACKGROUND OF THE INVENTION

Classification of 2D shapes regardless of their position, size and orientation is an important problem in computer vision and pattern recognition. Its application is spread out into many fields, such as classification of blood cell, cancer and chromosomes, industrial inspection, target recognition, medical image recognition, scene analysis, and modeling of biological systems. Generally, shape classification is a process of comparing and recognizing shape by analyzing the information of the shape's boundaries. This seems an easy task for a human being, but is quite difficult for computers, particularly after objects are scaled, rotated and/or translated. Thus, the study of shape for the purpose of general object classification, recognition, or retrieval is an active field of current research.

Recent literature has addressed this topic, and various image processing methods have been applied. These methods can be basically classified into two techniques.

The first technique requires the projection of shape instances into a common space and then the implementation of classification on the projection space. For example: Fourier descriptors (E. Persoon, et al. "shape discrimination using Fourier descriptors" IEEE Trans. Syst. Man. Cybern, vol. 7, p 170-179, 1977), invariant moments (F. Zakaria, et. al "Fast algorithm for computation of moment invariants" Pattern Recognition, vol. 20, p 639-643, 1987), autoregressive models (S. R. Dubois, et. al "An autoregressive model approach to two-dimensional shape classification", IEEE Trans. Pattern Analysis and Machine Intelligence, vol. 8 p 55-66, 1986), and principal component analysis (U.S. Patent No. 2002/0164060 A1 entitled METHOD FOR CHARACTERISING SHAPES IN MEDICAL IMAGES).

An advantage of these projection-based methods is that they are independent of translation and rotation. However, a disadvantage is that they exhibit an inherent loss of information since the projection transformation is not a one-to-one correspondence. That is, one point in the projection space may correspond to several shapes whose visual appearance can be quite different. Therefore, shape classification based on such technique may lead to incorrect results.

The second technique comprises locating a set of landmark points along shape boundaries, specifying a distance measure between corresponding landmarks, and performing a distance-based clustering. As such, shape classification is reduced to the general clustering problem for which numerous solutions have been proposed. For example: M. Duta et. al. present a method using Mean Alignment Error (MAE) as a distance to measure the difference of shapes and classify shapes based on MAE. (M. Duta, et. al. "Automatic Construction of 2D Shape Models", IEEE Trans. on Pattern Analysis and Machine Intelligence, vol 23, no. 5, p 433-446, 2001). U.S. Pat. No. 6,611,630 entitled METHOD AND APPARATUS FOR AUTOMATIC SHAPE CHARACTERIZATION and U.S. Pat. No. 6,009,212 entitled METHOD AND APPARATUS FOR IMAGE REGISTRATION are directed to a method to classify shapes based on a best match probability with an average shape of a characterizing population group. The limitation of this technique is that pair wise correspondence between the landmarks of shapes is difficult to achieve in practice because of the noise and variation among individuals.

Given the drawbacks and limitation of the prior art, there exists a need for a method to find a simple, efficient and highly accurate method for shape classification.

SUMMARY OF THE INVENTION

An objective of the present invention is to provide an automated method for 2D shape classification.

According to one aspect of the present invention, this objective is achieved by providing an automated method for classifying 2D shapes. The method includes several steps. A training dataset is created for the shape under study. The training set includes two groups of data: a similar shape group and a dissimilar shape group. A polygonal approximation for each shape in the training dataset is generated, and an average shape from the similar shape group is computed. The shapes in the database are aligned to the average shape and their similarity distances is outputted. The distribution of similarity distances is obtained and the shapes are classified into two clusters based on their distances.

The present invention is viewed as having some advantages. For example, the method characterizes the study shape by an average shape and a threshold related to the similarity distances. The shape classification is efficient, since its computation complexity is controlled under $O(mn \log(mn))$, where m is the number of landmarks on the average shape and n is the number of landmarks on a shape instance. The shape classification is robust, since no pairwise correspondence of landmarks is required during shape alignment, and even the number of landmarks can be different. Further, the orientation correction becomes easier since the rotation angle of a shape instance to the average shape can be provided after shape alignment.

BRIEF DESCRIPTION OF THE DRAWINGS

The foregoing and other objects, features, and advantages of the invention will be apparent from the following more particular description of embodiments of the invention, as illustrated in the accompanying drawings. The elements of the drawings are not necessarily to scale relative to each other.

FIGS. 2A-2U are diagrammatic views showing exemplary shapes extracted from the training database of cistern shape. FIGS. 2A-2K depict the shapes belonging to the similar shape group, and FIGS. 2L-2U depict the shapes from the dissimilar shape group.

FIG. 3A depicts a polygonal approximation generated by equal angle sampling. FIG. 3B illustrates a polygonal approximation created by filling a number of equidistance points.

FIGS. 4A and 4B display the turning functions of the template shape. FIGS. 4C and 4D show the turning functions of a shape instance. FIGS. 4E and 4F demonstrate the alignment result of these two shapes and their best matched turning functions.

FIG. 6A is a graphical view which shows the aligned turning functions. FIG. 6B illustrates an example to compute a mean point from a segment. FIG. 6C is the average shape computed from the similar shape group.

DETAILED DESCRIPTION OF THE INVENTION

Figure 1A:
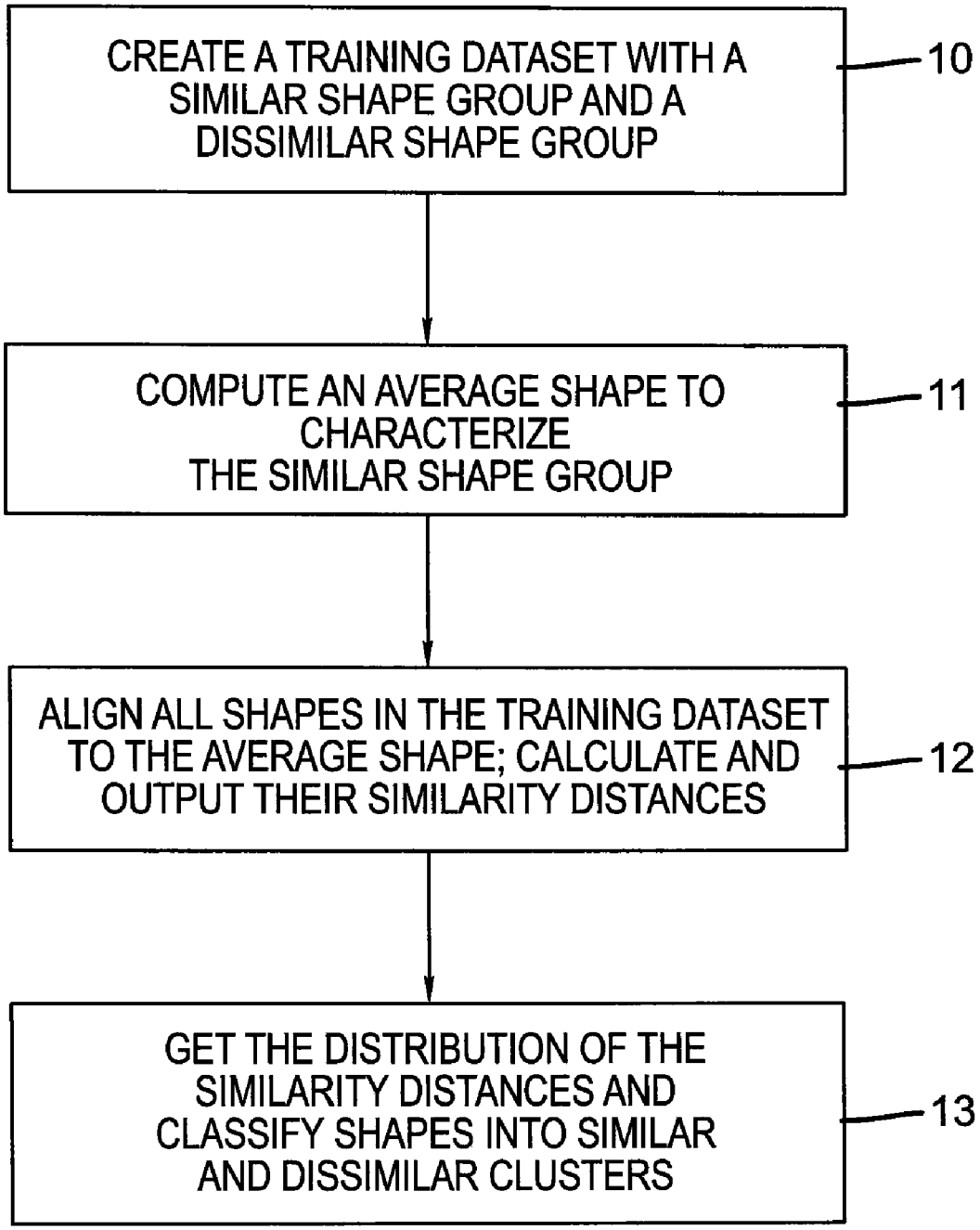
FIGS. 1A and 1B are flow charts illustrating the automated methods for shape classification.

The following is a detailed description of the preferred embodiments of the invention, reference being made to the drawings in which the same reference numerals identify the same elements of structure in each of the several figures.

The present invention discloses a method for automatically classifying 2D shapes in images. A flow chart of a method in accordance with the present invention is generally shown in FIG. 1A. As shown in FIG. 1A, the method includes four steps. First, a training dataset or database of study shape is created, which includes two group data: a similar shape group and a dissimilar shape group (step 10). Then, an average shape to characterize the similar shape group is computed (step 11). Next, the shapes in the database are aligned to the average shape and their similarity distances are calculated and output (step 12). Finally, the distribution of the similarity distances is obtained and used to classify the shapes into two clusters: similar and dissimilar (step 13).

Figure 1B:
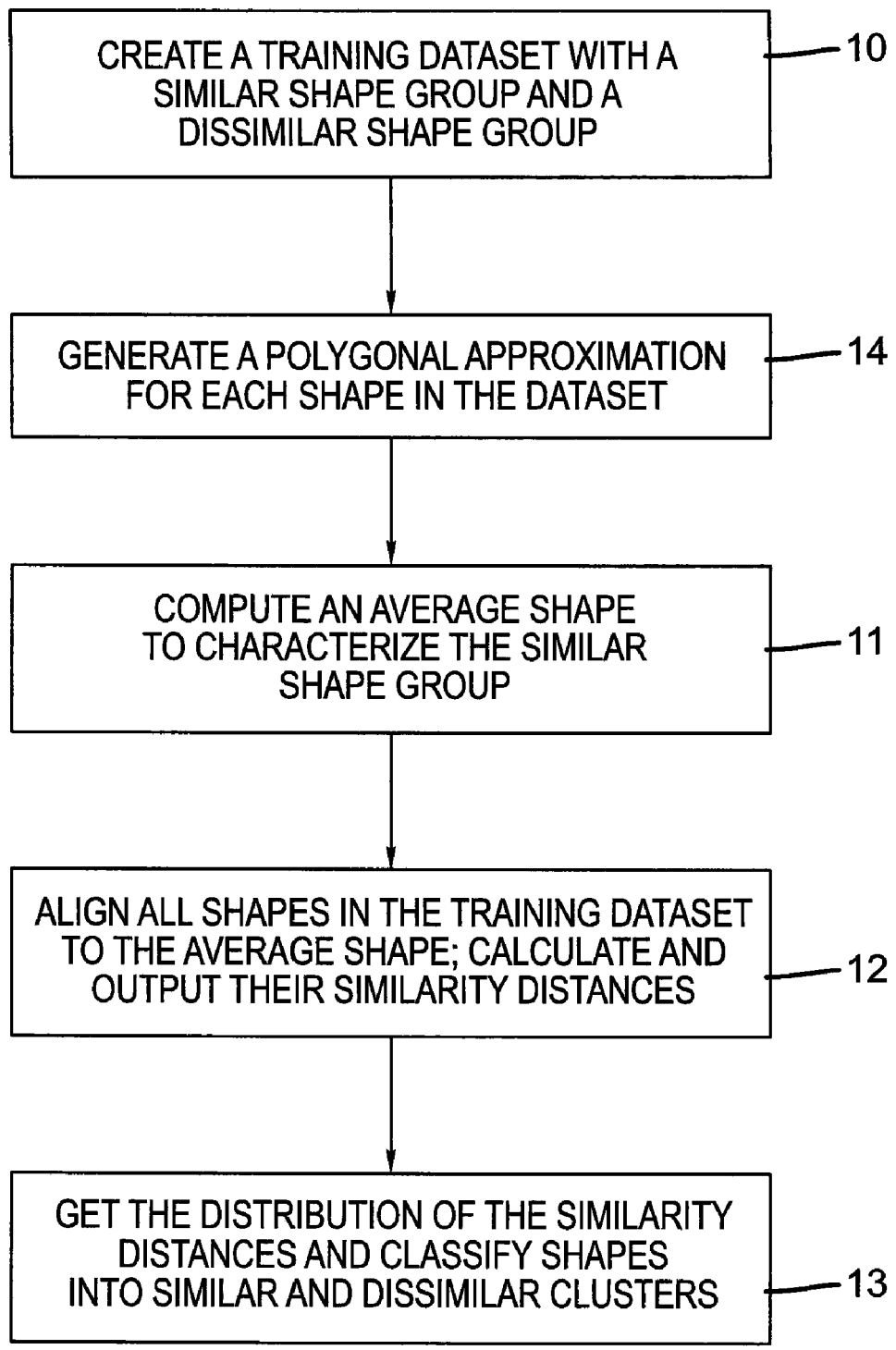

In a further embodiment, shown in the flow chart of FIG. 1B, an additional step can be applied prior to the computation of an average shape (step 11). The additional step (step 14) is the generation of a polygonal approximation for each shape in the training dataset, and will be more particularly described below.

FIG. 2 shows an exemplary training dataset, in which the study shape (i.e., a target shape) is the shape of a cistern extracted from brain images. The training dataset is created by manually selecting two types of shapes: the similar shapes and the dissimilar shapes. The similar shapes represent the same object type, therefore they appear to have a high degree of similarity. In this example, all shapes from the similarity group are extracted from cisterns in brain images, as shown in FIGS. 2A-2K. However, there may exist a shape variation among them because of noise, pose, and segmentation error as well as natural variation among individuals. Compared to the similar shapes, the dissimilar shapes are extracted from totally different objects types, for example ventricles, foot, skull, hand, and the like, as shown in FIGS. 2L-2U. Therefore, they demonstrate a large variety of shapes. The motivation of having two shape groups in the training dataset is to simplify the classification problem by focusing on the characteristics of study shape and its distinction from other shapes. To promote a robust shape classification, the shapes in the dataset may appear with varying orientation, position, and scale.

At step 14, a polygonal approximation of the boundary is generated to represent each share in the dataset. An advantage of interpreting a shape by a polygon is that it provides a simple description of shape with reduced loss of information. According to an embodiment of the present invention, the polygonal approximation can be generated by connecting a set of signature points and sampled points extracted from shape. The signature points are the points representing the salient features of shape, such as points with high curvature or at specified location. The sampled points are points located between the signature points based on a certain criteria.

Figure 3A:
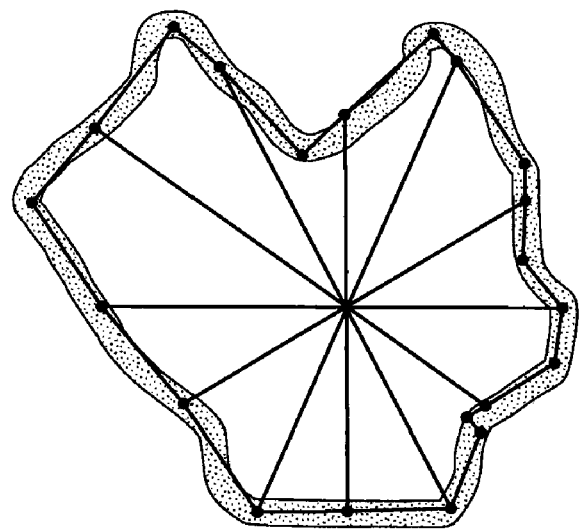
FIGS. 3A and 3B are graphical views which demonstrates a polygonal approximation of a shape boundary.

One criterion is to find the gravity center of the shape, draw an arbitrary radius from the gravity center to the shape boundary, and then place a set of sampled points along the boundary by moving the radius clockwise with the regular interval of 360/n degrees. The resulting shape can be represented as:

$$S=(r_{\theta 1},r_{\theta 2},r_{\theta 3},P_1,p_2 \ldots r_{\theta i},r_{\theta i+1}, \ldots p_j,r_{\theta i}) \; \theta_i = (360/n)*I$$

where $r_{\theta i}$, $1 \leq i \leq n$, is a sampled point obtained by the intersection between the i-th radius and the shape boundary. $p_j$ is a signature point. FIG. 3A depicts the polygonal approximation generated by this criterion.

Another criterion is to select sampled points by filling a number of equidistance points ($v_{di}$) between signature points. The shape can be given by:

$$S=(v_{d1},v_{d2},v_{d3},p_1,p_2 \ldots v_{d1},v_{d1+1} \ldots v_{dn},)$$

Figure 3B:
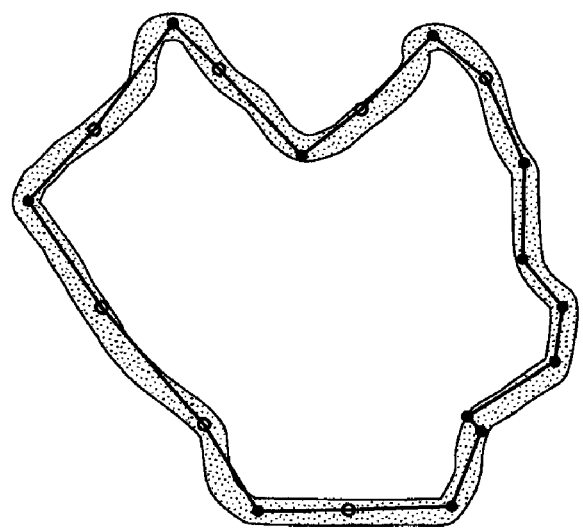

FIG. 3B demonstrates the result polygonal approximation.

It is noted that the present invention is not limited to using the above methods to generate the polygonal approximation of shape boundary. Other known algorithms can be used wherein the resultant polygon correctly approximates a shape without losing the salient information.

To measure shape similarity, two shapes are aligned as close as possible. According to an embodiment of the present invention, a method using turning functions as a basis for the similarity measure of shapes is provided. Given the polygonal approximations of two shapes, their distance is computed from the turning functions θ(s) of the two polygons. A turning function, or a cumulative angle function, represents a polygon by measuring the angle of the counter clockwise tangent as a function of the arc-length s from a reference point O on the shape approximation. It tracks the turning that takes place, for example, increasing with left hand turns, and decreasing with right hand turns. To ensure generality, the perimeter length of each polygon can be rescaled to 1. Thus, for a simple closed contour, θ(s) starts at θ(O) (assuming that the reference point O is placed at differential point along the contour) and increases to θ(1)=θ(O)+2π.

There are several properties that make the turning function particularly suited for shape similarity measurement. First, it is piecewise constant for polygons, making computations particularly easy and fast. Secondly, the function θ(s) is invariant under translation and scaling of the polygon according to the definition. Thirdly, rotation of the polygon over an angle θ corresponds to a vertical shift of the function with an amount θ, while changing the location of the reference point O by an amount t∈[0,1] along the perimeter of polygon results in a circular shift of the function θ(s).

Figure 4B:
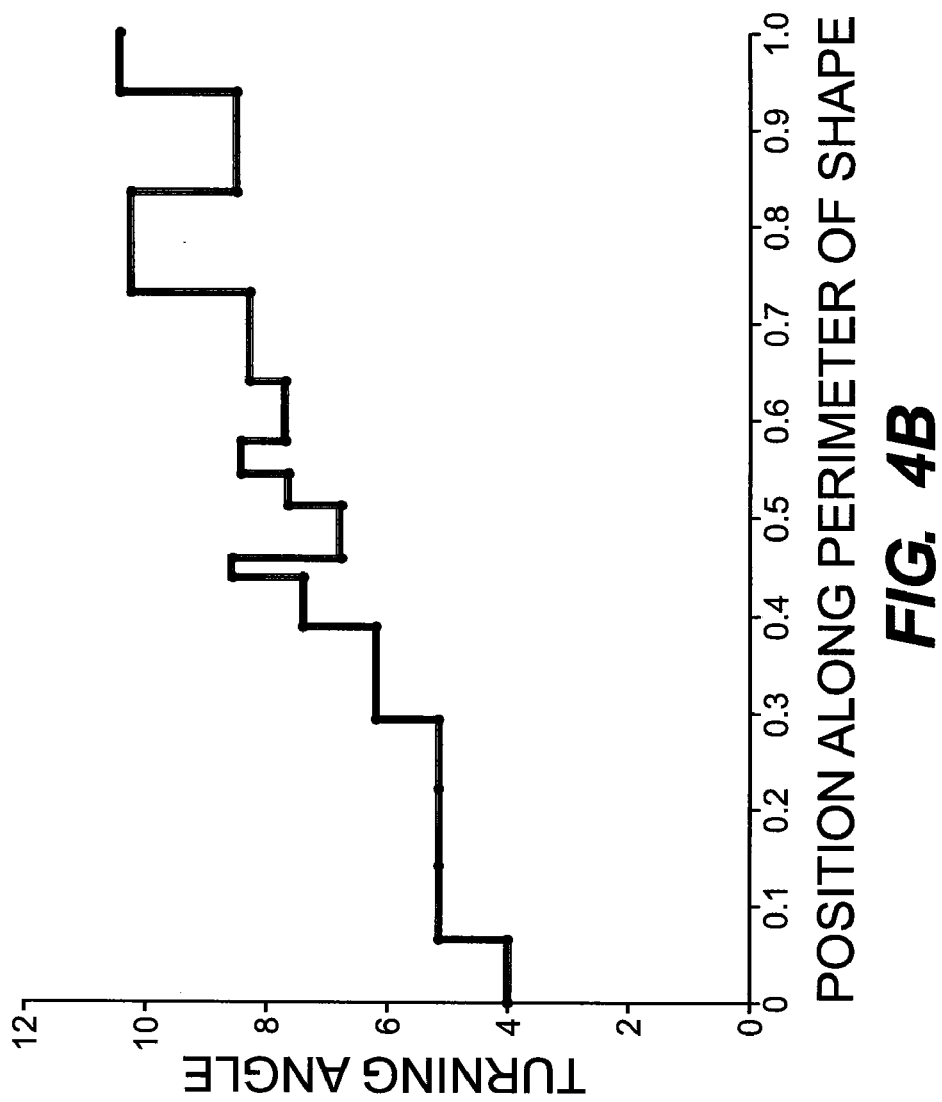
FIGS. 4A-4F are diagrammatic views illustrating the shape alignment by using the turning functions.
Figure 4A:
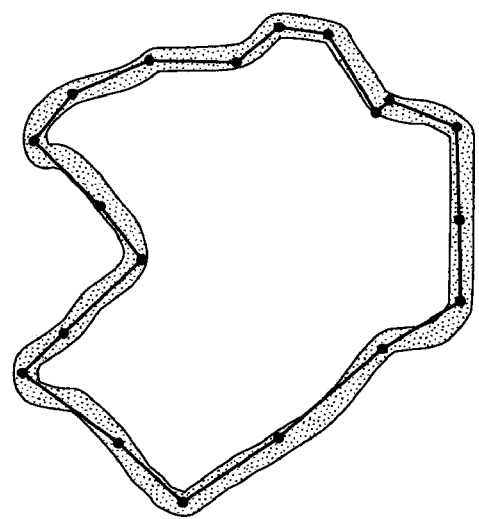
Figure 4D:
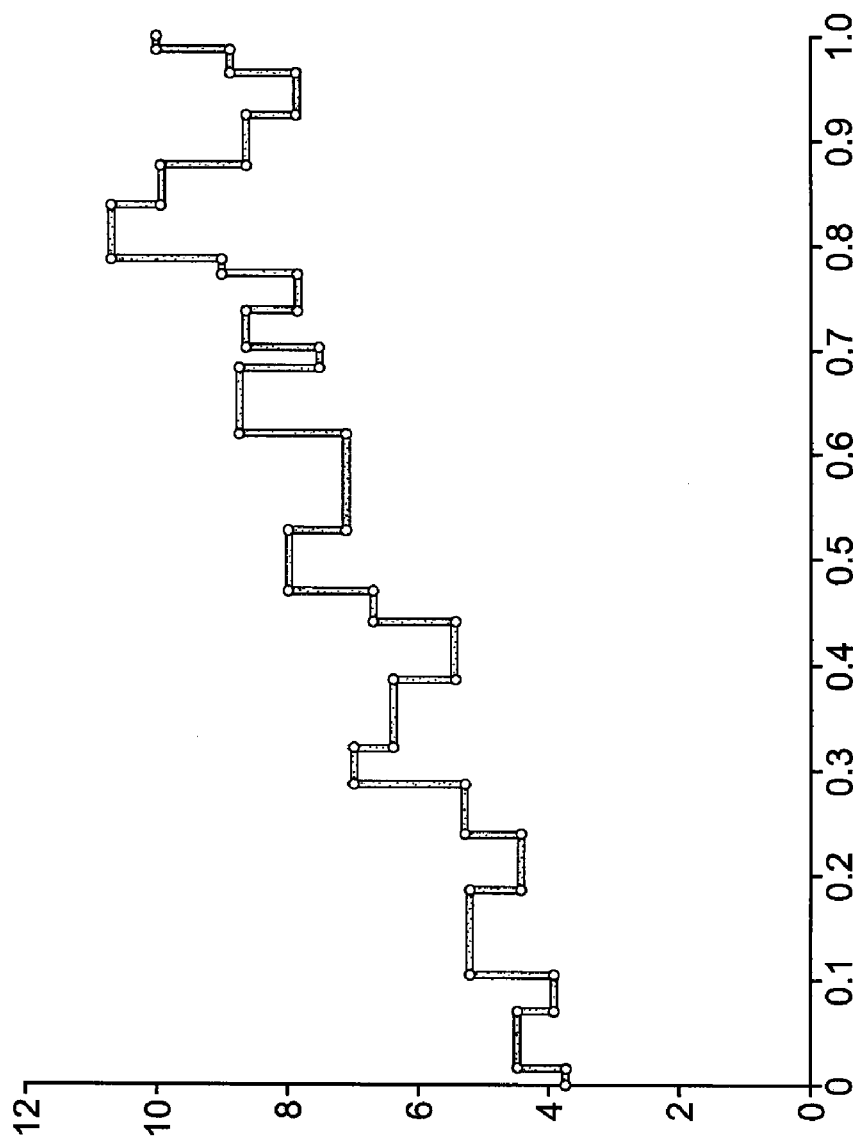
Figure 4C:
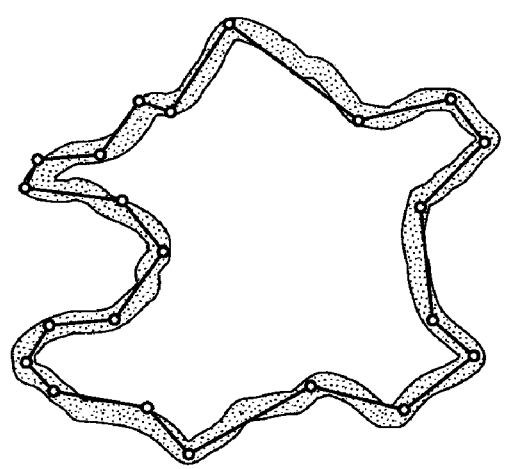

Let $T_p$ and $S_p$ be polygonal approximations of the template shape T and a shape instance S. FIGS. 4B and 4D display the turning functions of the two shapes shown in FIGS. 4A and 4C, respectively. The X-axis corresponds to the perimeter of shape and the Y-axis represents to the turning angle. The degree to which $T_p$ and $S_p$ are similar can be measured by taking the minimal $L_2$ distance between the turning functions $\theta_{T_p}(s)$ and $\theta_{S_p}(s)$, as defined by:

$$D_2^{T_p,S_p}(t, \theta) = \left( \min_{\theta \in \mathcal{R}, t \in [0,1]} \int_0^1 |\theta_{T_p}(s+1) - \theta_{S_p}(s) + \theta|^2 \, ds \right)^{\frac{1}{2}} \quad (1)$$

where t represents the position of the reference point along the polygon, and θ corresponds to the rotation of polygon. As shown by Arkin et al (E. M. Arkin, L. P. Chew, D. P. Huttenlocher, K. Kedem, and J. S. Mitcheel, "An efficiently computable Metric for Comparing Polygonal shapes". IEEE Trans. On Pattern Analysis and Machine Intelligence. Vol. 13 No. 3 1991 pp 209-215), this problem can be solved by:

$$D_2^{T_p,S_p}(t, \theta) = \left\{ \min_{t \in [0,1]} \left[ \int_0^1 (\theta_{T_p}(s+t) - \theta_{S_p}(s))^2 \, ds - (\theta^*(t))^2 \right] \right\}^{\frac{1}{2}} \quad (2)$$

where θ* is the optimal orientation for any fixed t and is given by:

$$\theta^* = \int_0^1 \theta_{S_p}(s)ds - \int_0^1 \theta_{T_p}(s)ds - 2\pi t \quad (3)$$

Figure 4F:
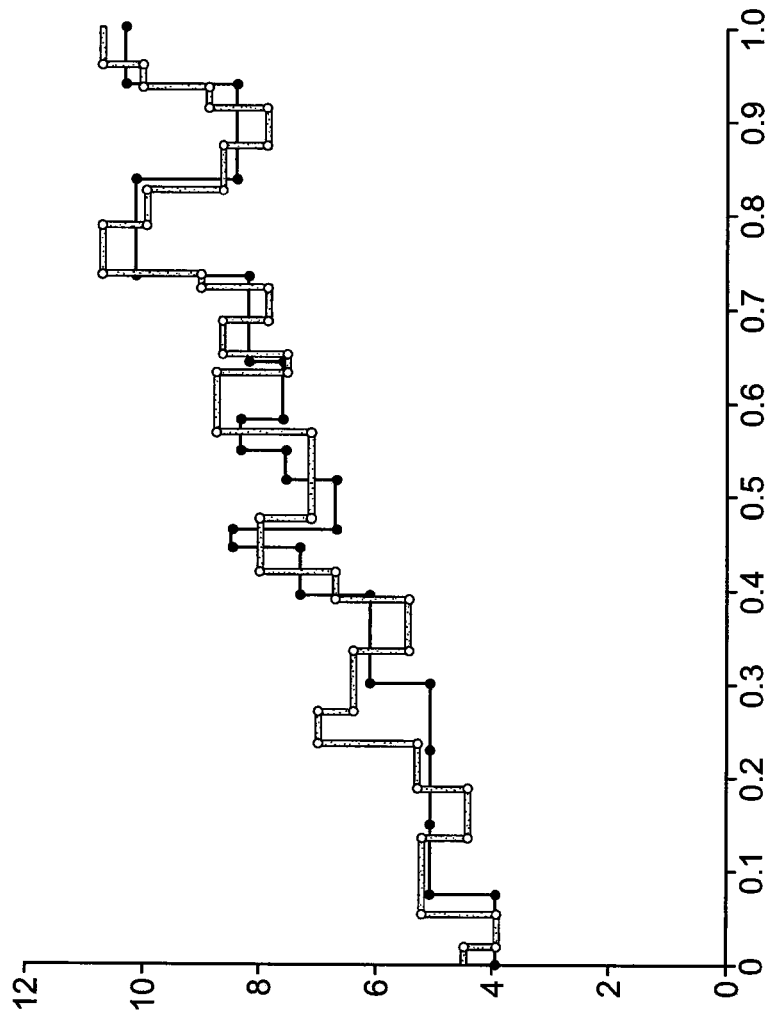
Figure 4E:
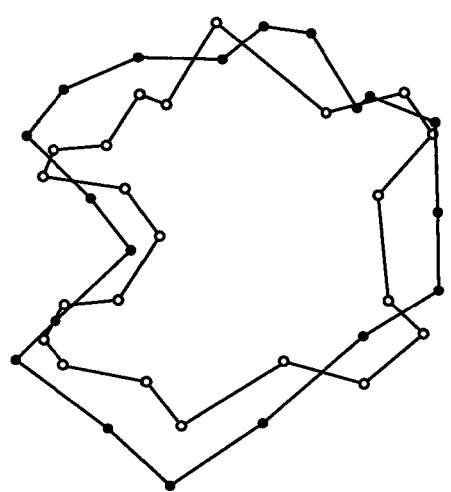

From these two equations, two matrices are obtained. One is $D_2$ matrix from Equation 2 and the other is θ matrix from Equation 3. The correct (i.e., best matched) orientation of the shape instance can be determined by searching the minimal $L_2$ distance in $D_2$ matrix and its corresponding element in $\theta_c$ matrix. FIGS. 4E and 4F demonstrate the alignment result of these two shapes and their best matched turning functions.

There are some advantages of using the turning function. For example, the rotation angle θ* from the best matched turning functions represents the orientation difference between two shapes, and can be used for orientation correction if needed. Further, the computation complexity for aligning two turning functions is O(mn log(mn)), where m is the number of landmarks on the template shape and n is the number of landmarks on a shape instance. This is also the computation complexity of the entire shape classification process, since shape alignment takes most time needed for shape classification comparing to the polygon approximation generation and distance classification as will be discussed below. Thus by choosing an appropriate number of landmarks, the shape classification can be made efficient. Another advantage of using the turning function (for example, rather than the distance between the corresponding landmark points) is that the requirement of one-to-one correspondence is no longer necessary, and even the number of landmarks can be different. This can promote shape classification robustness.

Figure 5:
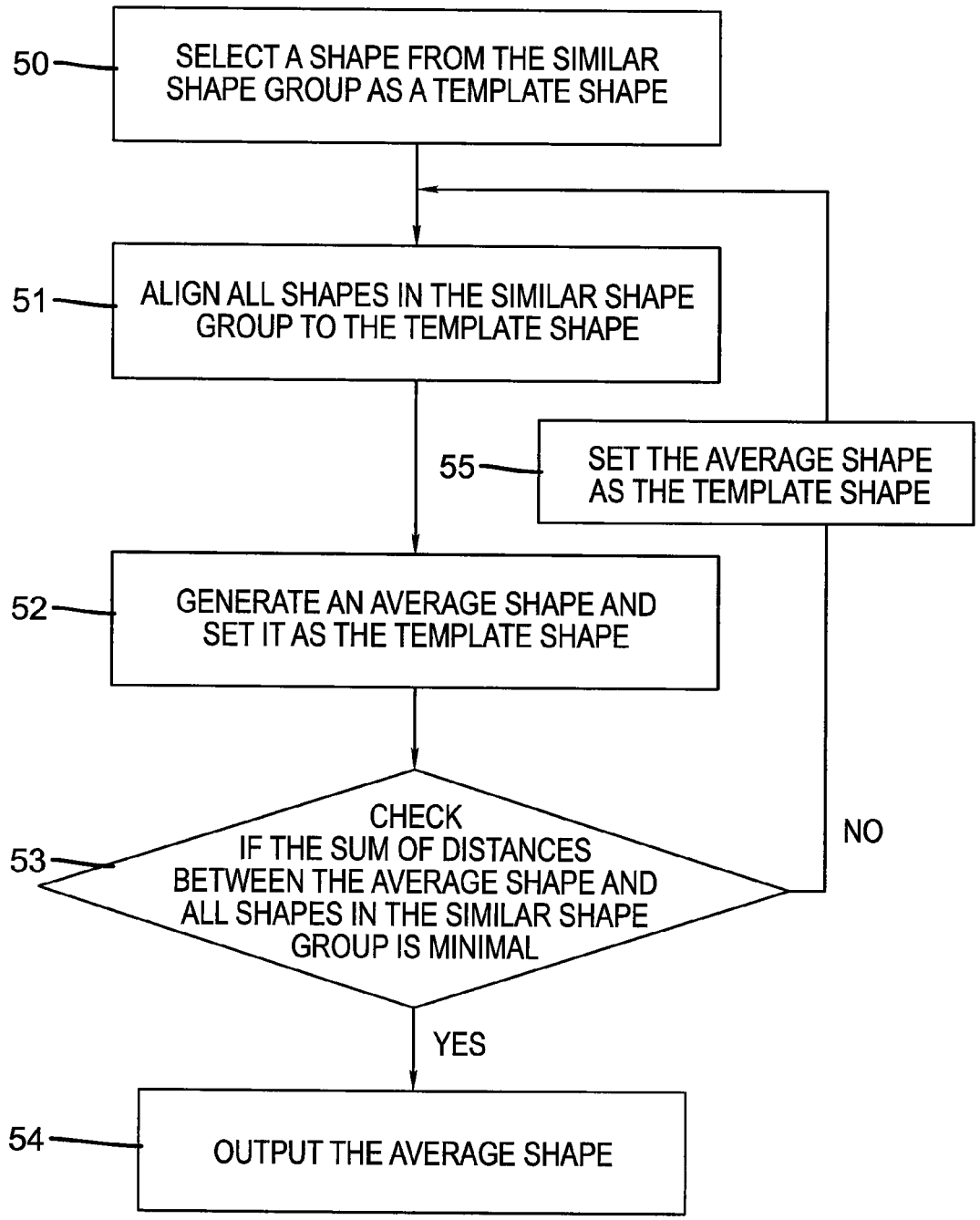
FIG. 5 is a flow char showing a way to compute an average shape from the similar shape group.
Figure 6A:
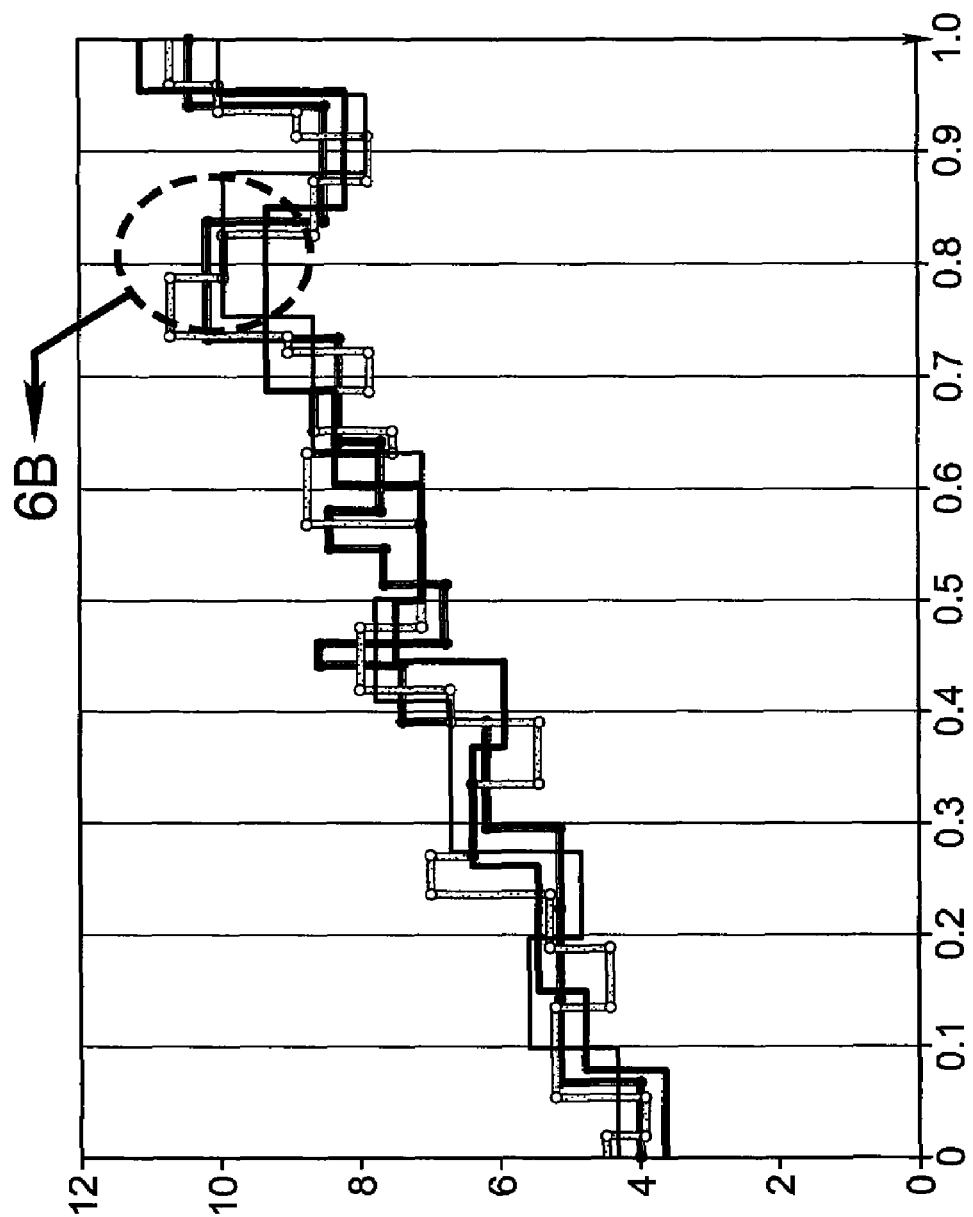
FIG. 6A-6C illustrate a method to obtain a mean point from each segment of the aligned turning functions.

Each shape in the similar shape group contributes to an average shape which characterizes the feature of shape under study. FIG. 5 illustrates a suitable method to achieve this. The method first creates a template shape by randomly selecting a shape from the similar shape group (step 50). Then, the shapes in the similar shape group are aligned to the template shape with the best matched turning functions (step 51). FIG. 6A provides an illustration.

Figure 6C:
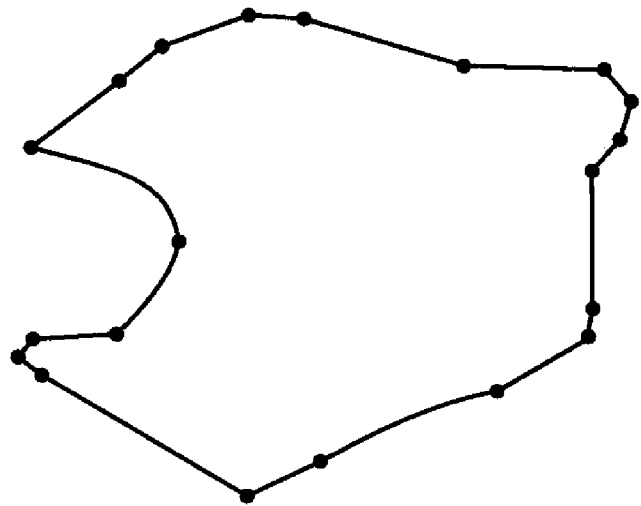
Figure 6B:
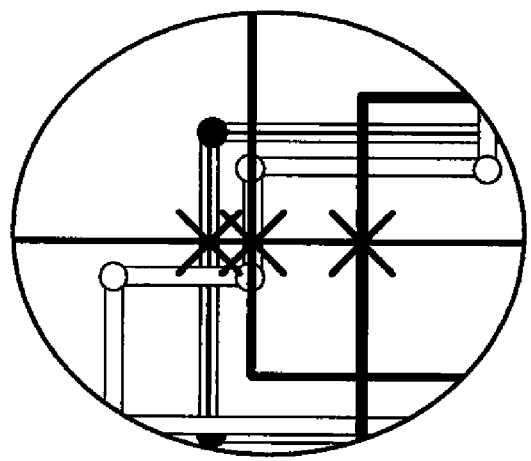

Next, the aligned turning functions are divided into n equidistance segments along the X-axis, which corresponds the perimeter length of a shape. In each segment, a mean point is determined from the first points on the turning functions. This is shown in FIG. 6B. By connecting the mean points together, an average shape can be constructed (step 52). However, this average shape may not best represent the shape characteristics of the similar shape group, since it highly depends on the selection of the template shape. To reduce such dependency and ensure the average shape captures the most mutual information in the similar shape group, the average shape is then set as the template shape, and the above processes are repeated until the sum of distances between the average shape and all shapes in the similar shape group reaches the minimal distance cross all shapes in the group (step 53), as given by:

$$D_{Total} = \min\left( \sum_i^n D_2^{T,S_i} \right)$$

Several cycles of the process may be needed for the average shape to converge. The final average shape is then output as the average shape characterizing the similar shape group (step 54). FIG. 6C illustrates the average shape computed from the similar shape group of FIGS. 6A and 6B.

Figure 7:
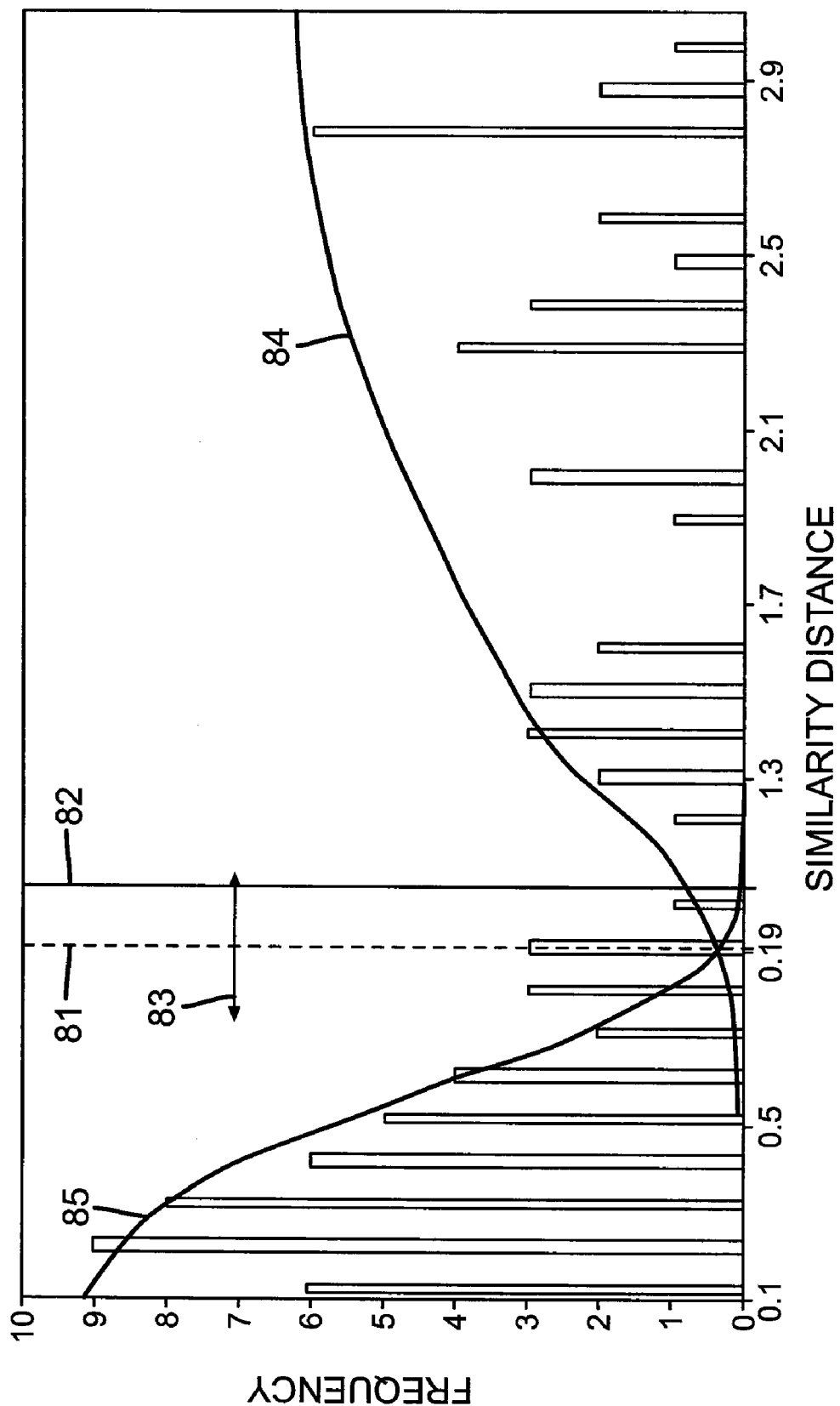
FIG. 7 is a diagrammatic view which shows a distance distribution of the training dataset for the study shape and illustrate the way to find a threshold.

When the average shape (step 54/step 11) is obtained, the shapes in the training dataset are aligned to it and their similarity distances $D_2$ are computed (step 12). Combining the distances together forms a distribution of the similarity distances of the training dataset, as shown in FIG. 7. The X-axis in FIG. 7 represents the distance value, and the Y-axis corresponds to the frequency of the distance. The origin of the coordinate is associated with the average shape. An observation of the distribution shows the difference between the similar shape group and the dissimilar shape group. For the shapes in the similar shape group, their distances (85), in general, are small and close to each other, which would be anticipated since they represent the same type object and appear relatively similar to the average shape. In contrast, the distances of shapes in the dissimilar shape group (84) present a large variation. Some are even far away from the origin because of their significant distinctions from the average shape.

At step 13, the shapes are classified into two groups based on their distances. Since the distance distribution is one dimension, the classification problem can be simplified as determining an appropriate threshold to obtain a "good" discrimination of distances. Known thresholding methods based on image histogram shape analysis can be employed wherein the threshold can minimize the classification error. The distance distribution of the similar shape group can be assumed to the normal distribution. The mean of the distribution is set to zero, which corresponds to the average shape. The variance σ of distribution accounts for the shape variation within the similar shape group. In one particular application, Applicant set the initial threshold (81) as 3*σ, as shown in FIG. 7. Then a search is performed within a neighborhood region (83) until the best-fit threshold (82) is found which minimizes the classification error.

According to the present invention, the classification of study shape is dependent upon an average shape together with its classification threshold extracted from the training dataset. As new shapes are input, they are compared against the average shape of the study shape. If a match is found and its distance is less than the threshold, the new shape is classified as a member of the similar shape group. To promote consistency and the accuracy of the classification, the characteristic average shape and classification threshold are refined to reflect the addition of new members, which can be accomplished by updating the average shape and classification threshold (e.g., every time) when the new shapes accumulate to a certain amount.

Note that the disclosed method focuses on one shape type, and the classification result is either YES or NO (eg. 1 or 0). If a more complicated system is needed to classify several different shape types in the database, the disclosed method can be extended by creating a training dataset for each shape type, then studying the average shape and the classification threshold for each type, and finally performing classification by finding a shape type with the minimal similarity distance.

The present invention may be implemented for example in a computer program product. A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The system of the invention can include a programmable computer having a microprocessor, computer memory, and a computer program stored in said computer memory for performing the steps of the method. The computer has a memory interface operatively connected to the microprocessor. This can be a port, such as a USB port, over a drive that accepts removable memory, or some other device that allows access to camera memory. The system includes a digital camera that has memory that is compatible with the memory interface. A photographic film camera and scanner can be used in place of the digital camera, if desired. A graphical user interface (GUI) and user input unit, such as a mouse and keyboard can be provided as part of the computer.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Step—Create a training dataset of the study shape with: a similar shape group and a dissimilar shape group.
11 Step—Compute an average shape for the similar shape group.
12 Step—Align all shapes to the average shape and output their similarity distances.
13 Step—Get the distribution of the similarity distances and classify shapes.
14 Step—Generate a polygonal approximation for each shape.
50 Step—Select a shape from the similar shape group as a template shape.
51 Step—Align all shapes in the similar shape group to the template shape.
52 Step—Generate an average shape and set if as the template shape.
53 Step—Check if the sum of distances between the average shape and all shapes in the similar shape group is minimal.
54 Step—Output the average shape.
55 Step—Set the average shape as the template shape
81 initial threshold
82 final threshold
83 search neighborhood region
84 distribution of the dissimilar shape group distribution of the similar shape group

What is claimed is:

1. A method for classifying two-dimensional shapes, comprising using a computer to perform steps of:
   creating a training shape dataset including a similar shape group and a dissimilar shape group;
   computing a first average shape from the similar shape group;
   generating first polygonal approximations of shapes in the training shape data set and of the first average shape;
   generating cumulative angle turning functions for the first polygonal approximations;
   using the turning functions, aligning the first polygonal approximations of shapes in the training shape dataset to the first polygonal approximation of the first average shape to produce aligned shapes;
   computing first similarity distances between the turning functions of the aligned shapes in the training shape dataset and the first average shape;
   generating a distribution of the frequency of the first similarity distances for the aligned shapes;
   accessing a new shape;
   generating a second polygonal approximation of the new shape;
   generating a cumulative angle turning function for the second polygonal approximation;
   using the turning functions for the second polygonal approximation and for the first polygonal approximation of the first average shape, aligning the polygonal approximations of the new shape and the first average shape;
   computing a second similarity distance between the turning functions for the second polygonal approximation of the new shape and the first polygonal approximation of the first average shape; and
   using the distribution, classifying the new shape into either the similar shape group or the dissimilar shape group based on the second similarity distance.

2. The method of claim 1, wherein the step of computing the first average shape comprises steps of:
   identifying one shape from the similar shape group as a template shape;
   aligning shapes in the similar shape group to the template shape;

generating a second average shape from the similar shape group;

determining a sum of distances between the second average shape and the shapes in the similar shape group; and outputting the first average shape when the sum of distances is a minimum.

3. The method of claim 2, wherein the step of outputting comprises steps of:

identifying the second average shape as the template shape; and repeating the steps of aligning, generating, and determining until the sum of distances is a minimum.

4. The method of claim 1, wherein the step of classifying a new shape comprises a step of:

identifying a classification threshold from the distribution by which to classify the new shape.

5. A method for classifying two-dimensional shapes, comprising using a computer to perform steps of:

creating a training shape dataset including a similar shape group and a dissimilar shape group;

computing a first average shape from the similar shape group;

aligning shapes in the training shape dataset to the first average shape;

using polygonal approximations of the aligned shapes, computing a similarity distance between the shapes in the training shape dataset and the first average shape;

generating a distribution of the frequency of similarity distances for shapes in the training shape dataset;

accessing a new shape;

using the distribution, classifying the new shape into either the similar shape group or the dissimilar shape group based on a similarity distance of the new shape, the classifying including a step of identifying a classification threshold from the distribution by which to classify the new shape; and updating the first average shape, the distribution of the frequency and the classification threshold using the new shape, when the new shape has been classified into the similar shape group.

6. The method of claim 5, wherein the step of computing the first average shape comprises steps of:

identifying one shape from the similar shape group as a template shape;

aligning shapes in the similar shape group to the template shape;

generating a second average shape from the similar shape group;

determining a sum of distances between the second average shape and the shapes in the similar shape group; and outputting the first average shape when the sum of distances is a minimum.

7. The method of claim 6, wherein the step of outputting comprises steps of:

identifying the second average shape as the template shape; and repeating the steps of aligning, generating, and determining until the sum of distances is a minimum.

8. The method of claim 5, wherein the step of aligning shapes comprises steps of:

generating a polygonal approximation for each of the shapes; and using a cumulative angle turning function to align the polygonal approximation to the first average shape.

9. A method for classifying two-dimensional shapes, comprising using a computer to perform steps of:

creating a training shape dataset including a similar shape group and a dissimilar shape group;

computing a first average shape from the similar shape group;

aligning shapes in the training shape dataset to the first average shape;

using polygonal approximations of the aligned shapes and cumulative angle turning functions of the polygonal approximations, computing a similarity distance between the shapes in the training shape dataset and the first average shape;

generating a distribution of the frequency of similarity distances for shapes in the training shape dataset;

accessing a new shape;

using the distribution, classifying the new shape into either the similar shape group or the dissimilar shape group based on a similarity distance of the new shape, the classifying including a step of identifying a classification threshold from the distribution by which to classify the new shape; and updating the first average shape, the distribution of the frequency and the classification threshold using the new shape, when the new shape has been classified into the similar shape group.

10. The method of claim 9, wherein the step of computing the first average shape comprises steps of:

identifying one shape from the similar shape group as a template shape;

aligning shapes in the similar shape group to the template shape;

generating a second average shape from the similar shape group;

determining a sum of distances between the second average shape and the shapes in the similar shape group; and outputting the first average shape when the sum of distances is a minimum.

11. The method of claim 10, wherein the step of outputting comprises steps of:

identifying the second average shape as the template shape; and repeating the steps of aligning, generating, and determining until the sum of distances is a minimum.

12. The method of claim 9, wherein the step of aligning shapes comprises steps of:

generating a polygonal approximation for each of the shapes; and using a cumulative angle turning function to align the polygonal approximation to the first average shape.

13. A method for classifying two-dimensional shapes, comprising using a computer to perform steps of:

creating a training shape dataset including a similar shape group and a dissimilar shape group;

computing a first average shape from the similar shape group;

generating first polygonal approximations of shapes in the training shape data set and of the first average shape;

aligning the first polygonal approximations of shapes in the training shape dataset to the first polygonal approximation of the first average shape to produce aligned shapes;

computing first similarity distances using the aligned first polygonal approximations of the aligned shapes in the training shape dataset and the first average shape;

generating a distribution of the frequency of the first similarity distances for the aligned shapes;

accessing a new shape;

generating a second polygonal approximation of the new shape;

aligning the polygonal approximations of the new shape and the first average shape;

computing a second similarity distance using the aligned polygonal approximations of the new shape and the first average shape; and using the distribution, classifying the new shape into either the similar shape group or the dissimilar shape group based on the second similarity distance.

14. The method of claim 13, wherein the step of computing the first average shape comprises steps of:

identifying one shape from the similar shape group as a template shape;

aligning shapes in the similar shape group to the template shape;

generating a second average shape from the similar shape group;

determining a sum of distances between the second average shape and the shapes in the similar shape group; and outputting the first average shape when the sum of distances is a minimum.

15. The method of claim 14, wherein the step of outputting comprises steps of:

identifying the second average shape as the template shape; and repeating the steps of aligning, generating, and determining until the sum of distances is a minimum.

16. The method of claim 13, wherein the step of classifying a new shape comprises a step of:

identifying a classification threshold from the distribution by which to classify the new shape.

* * * * *